US 12,544,949 B2

(12) United States Patent
Bosson

(10) Patent No.: US 12,544,949 B2
(45) Date of Patent: Feb. 10, 2026

(54) PRODUCTION PROCESS FOR MANUFACTURE OF A LAMINATE

(71) Applicant: WOOD ENGINEERING TECHNOLOGY LIMITED, Auckland (NZ)

(72) Inventor: Warwick Bosson, Auckland (NZ)

(73) Assignee: WOOD ENGINEERING TECHNOLOGY LIMITED, Auckland (NZ)

( * ) Notice: Subject to any disclaimer, the term of this patent is extended or adjusted under 35 U.S.C. 154(b) by 0 days.

(21) Appl. No.: 18/816,176

(22) Filed: Aug. 27, 2024

(65) Prior Publication Data

US 2024/0416549 A1 Dec. 19, 2024

Related U.S. Application Data

(63) Continuation of application No. 17/441,347, filed as application No. PCT/IB2020/053376 on Apr. 9, 2020, now abandoned.

(30) Foreign Application Priority Data

Apr. 9, 2019 (NZ) .......................................... 752503
Apr. 9, 2019 (NZ) .......................................... 752505

(51) Int. Cl.
*B27M 3/00* (2006.01)
*B07C 5/14* (2006.01)
(Continued)

(52) U.S. Cl.
CPC ............. *B27M 3/0086* (2013.01); *B07C 5/14* (2013.01); *B27B 1/002* (2013.01); *B27M 3/002* (2013.01); *B32B 7/12* (2013.01); *B32B 37/16* (2013.01)

(58) Field of Classification Search
CPC ........ B27M 3/002; B27M 3/0086; B07C 5/14
(Continued)

(56) References Cited

U.S. PATENT DOCUMENTS

| 4,069,851 | A | 1/1978 | Bibler |
| 8,088,494 | B2 | 1/2012 | Bosson |
| 2007/0157994 | A1 | 7/2007 | Scoville et al. |

FOREIGN PATENT DOCUMENTS

| AU | 2013270595 A1 | 1/2014 |
| JP | 2002-067010 | 3/2002 |

(Continued)

OTHER PUBLICATIONS

International Search Report/Written Opinion on International Appl. No. PCT/IB2020/053376, Dtd May 25, 2020, 15 pgs.

*Primary Examiner* — Molly K Devine
(74) *Attorney, Agent, or Firm* — Foley & Lardner LLP

(57) ABSTRACT

This invention relates to a process for the division of an individual input source log into discrete longitudinal lengths for subsequent processing. The process comprises receiving an individual input source log, dividing the input source log into one or a plurality of output log portions of a predetermined length, wherein at least a portion of said output log portions resultant from said division are of a substantially equal or substantially constant or consistent longitudinal length, and wherein said substantially equal or substantially constant or consistent longitudinal length output log portions are procured as a feed stream of log material for a subsequent processing step. This process provides for the processing of logs and subsequent assembly into an end product formed from a composite of sticks derived from said processed logs.

14 Claims, 2 Drawing Sheets

(51) Int. Cl.
*B27B 1/00* (2006.01)
*B32B 7/12* (2006.01)
*B32B 37/16* (2006.01)

(58) Field of Classification Search
USPC .......................................................... 144/346
See application file for complete search history.

(56) References Cited

FOREIGN PATENT DOCUMENTS

WO    WO-2008/093001 A1    8/2008
WO    WO-2012/025671 A2    3/2012

PRODUCTION PROCESS FOR MANUFACTURE OF A LAMINATE

CROSS-REFERENCE TO RELATED APPLICATIONS

This application is a continuation of a U.S. patent application Ser. No. 17/441,347, filed Sep. 21, 2021, which is a U.S. national phase application under 35 U.S.C. § 371 of International Application No. PCT/IB2020/053376, filed on Apr. 9, 2020, which claims the benefit of priority to New Zealand Patent Application No. 752,503, filed on Apr. 9, 2019, and New Zealand Patent Application No. 752,505, filed on Apr. 9, 2019, which are all incorporated herein by reference in their entireties.

TECHNICAL FIELD

This disclosure relates to value extraction from tree stem materials (without any reduction to discrete fibre form) (i.e. from tree stem lengths) so as to provide resultant products of utility which, especially when from lower valued material and/or lower valued logs of a tree stem, will represent lumber value enhancement, or alternatively for greater utilisation of log material and conversion into resultant product.

BACKGROUND ART

Traditionally, dimensional lumber is produced for two main purposes. The first purpose being structural lumber and the second being appearance lumber. A third purpose also being for packaging.

Structural lumber is produced and graded for properties of strength and stiffness. So-called "Early Wood" (core wood) has lower basic properties than so-called "Late wood" and inclusion of "Early Wood" in a piece of dimensional lumber can cause strength down grading. Defects, (knots, resin pockets, bark inclusions, decay, insect attack, shakes, etc.) also lead to down grading although in pine knots have the dominant influence. These defects tend to be scattered through the length of a piece of lumber and lead to down grading on the basis of "a piece is only as strong as the weakest link".

Appearance suitable lumber is produced and selected on the basis of surface appearance. Appearance grades can range from "Clears" for furniture type end uses to "merchantable" for exterior finishing. The important features are lack of defects particularly those that affect the surface finish. Inter-grown knots do not result in a down grade and for unpainted surfaces can be considered an attractive feature.

For any particular feedstock (log grade) and cutting regime a wide range of properties will be produced. The total output can be tested and graded or inspected and graded after initial sawing. Even within grades there is a wide range of properties.

This range of properties is produced when a log is broken down into (typically 100×50 mm) sections. If a log is broken down into even smaller sections (say 50×7 mm) it has been found there will be a greater spread of properties.

With traditional dimensional lumber the output range is predominantly influenced by selection of feedstock (tree age, position in the tree, silver-culture regime) although there is some minor influence from the sawing patterns selected.

Nevertheless, efficiencies of usage while still providing acceptable engineered resultant lumber products, especially to customer demand, can still further be improved where source materials are single or multi forest derived single or multi-grade logs.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

SUMMARY

It is an object of the present invention, or an alternate object, to addresses issues of waste reduction during the production of dimensional lumber and in so doing preferably improve usage or utilisation of feedstock for the purpose of value enhancement.

It is also an object of the present invention, or an alternate object, to provide a method of producing laminated elongate lumber products and to related products, practices and procedures reliant on a performance advantage over mere random assembly.

It is also an object of the present invention, or an alternate object, to provide an overall process capable of better using logs or part of tree stems (and particularly those of conifers such as Radiata Pine, Loblolly Pine, Douglas Fir, Spruce, etc.) which might otherwise only be suitable for chipping or non-structural lumber.

It is also an object of the present invention, or an alternate object, for the conversion of low-grade wood into high grade products.

In a first aspect, there is provided a process for the division of a source log into discrete longitudinal lengths for subsequent processing, comprising dividing a source log into a plurality of substantially consistent or substantially constant predetermined length log portions, and wherein said plurality of substantially consistent or substantially constant predetermined length log portions are provided for a subsequent processing step.

In a second aspect, there is provided a process for the division of a source log into discrete longitudinal lengths for subsequent processing, comprising simultaneously dividing a source log into a plurality of substantially consistent or substantially constant predetermined length log portions, and wherein said plurality of substantially consistent or substantially constant predetermined length log portions are provided for a subsequent processing step.

In a third aspect, there is provided a process for the division of an individual input source log into discrete longitudinal lengths for subsequent processing, wherein said process comprises:

receiving an individual input source log, optionally, locating said individual input source log longitudinally, or advancing said individual input source log to a datum location, such as on a cutting deck or a support platform for a subsequent log division operation (optionally providing said input source log to said cutting deck or a support platform for the subsequent division in a singular lift or singular lift operation), optionally, restraining said individual input source log upon a cutting deck or a support platform, whether in a longitudinal direction (such as a log length or log end-wise) direction or in rotational or angular direction (such as to restrain said log from axial rotation), or both, for restraint during a subsequent log division operation, dividing the input source log into one or a plurality of output log portions of a predetermined length, wherein at least a portion of said output log portions resultant from said division are of a substantially equal or substantially constant or consistent longitudinal length, and wherein said substantially equal or substantially constant or consistent longitudinal length output log portions are procured as a feed stream of log material for a subsequent processing step.

In relation to one or more of the first or second or third aspects, in some embodiments, one or more of said predetermined length log portions provided for a subsequent processing step may be accumulated, optionally being a temporary accumulation or temporary store, for provision to a subsequent processing step. Advantageously, said accumulation or store of said predetermined length log portions being drawn upon or selected for a downstream subsequent processing step when there may be an interruption of an upstream processing step. Alternatively, said accumulation or store may be utilised to facilitate a continuing of an upstreaming processing step, when there may be an interruption of a downstream processing step.

In a fourth aspect, there is provided a process of dividing an output log portion procured as a feed stream of log material for subsequent processing into a stream of a plurality of sticks, comprising:

end mounting said output log portion (i.e. each/both end of said output log portion is end mounted), making selective cuts of said output log portion by two or more rotary saw blades operable at substantially 90 degrees with respect to each other thereby to make cuts to free an individual stick from the mounted output log portion, said two or more saw blades longitudinally movable with respect to the longitudinal length of said mounted output log portion via a carriage on command, axially rotating said output log portion either in association with the step of rotary cutting of said output log portion or rotating said output log portion in an interval between a rotary cutting of said output log portion, and the removal of each cut stick (optionally automatically or in an automated manner) from the mounted output log portion by a vacuum or suction system once free of the output log portion (optionally being a robotic vacuum or suction system), and wherein the output log portion is (optionally on command) axially rotated so as to present surfaces of the output log portion to said two or more rotary saw blades to facilitate each pass of said two or more rotary saws along a longitudinal length of the output log portion to yield one or a plurality of individual sticks, said sticks to be provided as a stream of sticks for subsequent processing.

In a fifth aspect, there is provided an apparatus for the division of an output log portion procured as a feed stream of log material for subsequent processing into a stream of a plurality of sticks, comprising:

a pair of substantially opposing end mounts, each mount configured to be engageable with respective longitudinal ends of said output log portion, a drive configured to rotate said end mounts, a carriage with rotary saw blades to operate at 90 degrees with respect to each other thereby to make cuts to free a stick from a mounted output log portion in use in each carriage direction, a vacuum or suction system (optionally a robotic vacuum or suction system) to vacuum or suction remove each stick from the mounted output log portion as being and/or when cut free, and removal of each cut stick (optionally automatically or in an automated manner) from the mounted output log portion is by a vacuum or suction system once free of the output log portion (optionally being a robotic vacuum or suction system).

In relation to one or more of the fourth or fifth aspects, in some embodiments, one or more of said sticks of said stream of plurality of sticks may be accumulated, optionally being a temporary accumulation or temporary store, for provision to a subsequent processing step. Advantageously, said accumulation or store of said sticks being drawn upon or selected for a downstream subsequent processing step when there may be an interruption of an upstream processing step. Alternatively, said accumulation or store may be utilised to facilitate a continuing of an upstreaming processing step, when there may be an interruption of a downstream processing step.

Preferably, wherein said apparatus further comprises a logic program system to command at least the presentation of the mounted output log portion in use for each carriage pass thereby to optimise the yield of higher strength sticks in a range of strength sticks from each output log portion.

Preferably, wherein the sticks are not removed from the log by the carriage.

Preferably, wherein the sticks are removed from the output log portion by collection from a vacuum or suction system once free of the output log portion, optionally being a robotic vacuum or suction system.

In a sixth aspect, there is provided a production line to manufacture a laminated wooden beam, the beam to be of profiled strength grade laminae, each cut to length from strength matched grade finger jointed shooks, the use of apparatus comprising or including:

mounts to end mount and, on command, rotate a debarked log to provide the sticks, a carriage with rotary saw blades to operate at 90 degrees with respect to each other thereby to make cuts to free a stick from the mounted log in use in each carriage direction, the sticks not being dragged from the log by the carriage, a robotic system to suction remove each stick from the mounted log as being and/or when cut free, and a logic program system to command at least the presentation of the mounted log in use for each carriage pass thereby to optimise the yield of higher strength sticks in a range of strength sticks from each log.

Preferably, remainder log lengths not being of said predetermined length are discarded or are not utilised in subsequent processing step(s) of said process, or log lengths remaining from said division which do not achieve said predetermined length is/are discarded from said process.

Preferably, said longitudinal length of said substantially equal or substantially constant or consistent length output log portions is a predetermined longitudinal length.

Preferably, said substantially equal or substantially constant or consistent longitudinal length log portions are about 1 metre.

Preferably, a of said predetermined longitudinal length is about 1 metre.

Preferably, said substantially equal or substantially constant or consistent longitudinal length log portions are less than about 10 metres, or less than about 6 metres, or less than about 5 metres, or less than about 4 metres, or less than about 3 metres, or less than about 2.4 metres, or less than about 2 metres, or less than about 1.5 metres, or less than about 0.5 metres.

Preferably, remainder log lengths not being of said predetermined length are discarded or are not utilised in subsequent processing step(s) of said process, or log lengths remaining from said division which do not achieve said predetermined length is/are discarded from said process.

Preferably, wherein output log portions are discarded from being provided as a feed for subsequent processing where either:

said output log portions are of a substantially different longitudinal length to the predetermined longitudinal length, or said output log portions are of a substantially unequal or substantially non-constant or inconsistent longitudinal length relative to said substantially equal or substantially constant or consistent longitudinal length output log portions.

Preferably, each end of a substantially equal or substantially constant or consistent longitudinal length output log portion which is procured as a feed stream of log material for subsequent processing comprises substantially parallel ends (being a single log portion with a pair of opposing ends, said ends formed from said division operation of said input source log).

Preferably, at least two, or at least three (or more) log cutters may be provided for acting upon said input source log for dividing the input source log into said (optionally plurality of) output log portion(s).

Preferably, said log cutter may be one of: a chain saw, a blade saw, a band saw.

Preferably, each individual output log portion procured as part of a feed stream of log material for subsequent processing may be individually subjected to a further division operation to generate a plurality of cut sticks of a predetermined dimension from said output log portion, said plurality of cut sticks provided as an output stream of sticks.

Preferably, each individual output log portion procured as part of a feed stream of log material for subsequent processing is individually assessed to determine a further division operation to substantially maximise an available quantity of sticks of substantially equal or substantially constant or consistently dimension or cross-sectional profile as an output stream of sticks from said individual output log portion(s).

Preferably, said further division operation may be controlled (or varied or adjusted) so as to provide for said output stream of sticks sufficient for one or more of:

maximising the quantity of substantially equal or substantially constant or consistent dimension or cross-sectional profile sticks generated from an available volume of log material, minimising wastage or volume of log material unable to be used for generation of substantially equal or substantially constant or consistent dimension or cross-sectional profile sticks, maximising the quantity of substantially equal or substantially constant or consistent dimension or cross-sectional profile sticks from a particular portion of said log portion likely to be of a substantially similar performance or a characteristic requirement.

Preferably, each individual output log portion is sequentially divided into a plurality of substantially similarly or the same dimensioned sticks, or a series of streams of sticks wherein each such stream is a stream of the same or substantially similarly dimensioned sticks.

Preferably, each individual output log portion is sequentially divided into a plurality of substantially equal or substantially constant or consistent dimension or cross-sectional profile sticks, or a series of streams of sticks wherein each such stream is a stream of the same or substantially similarly dimensioned or cross-sectional profile sticks.

Preferably, each individual output log portion is subjected to a sequential division operation to provide for a resultant output stream of sticks being of a substantially equal or substantially constant or consistent longitudinal length as said individual log portion procured as part of said feed stream of log material for subsequent processing, and wherein at least a portion of said output stream of sticks resultant from said sequential divisional operation being of substantially equal or substantially constant or consistent longitudinal length are of a substantially consistent dimensionality with respect to cross-sectional profile (such as a width and a thickness) of each said resultant output stick as a stream of sticks.

Preferably, said output stream of sticks generated from the sequential division operation undergo an assessment or profiling as to one or more performance or characteristic requirements, to provide for a relative grading of each generated stick.

In relation to the sixth aspect, in some embodiments, one or more of said sticks may be accumulated, optionally being a temporary accumulation or temporary store, for provision to a subsequent processing step. Advantageously, said accumulation or store of said sticks being drawn upon or selected for a downstream subsequent processing step when there may be an interruption of an upstream processing step. Alternatively, said accumulation or store may be utilised to facilitate a continuing of an upstreaming processing step, when there may be an interruption of a downstream processing step.

In a further embodiment, in relation to the sixth aspect, in some embodiments, one or more of said sticks subsequently graded may be accumulated, optionally being a temporary accumulation or temporary store, accumulated or stored with like graded sticks, for provision to a subsequent processing step. Advantageously, said accumulation or store of graded sticks being drawn upon or selected for a downstream subsequent processing step when there may be an interruption of an upstream processing step. Alternatively, said accumulation or store may be utilised to facilitate a continuing of an upstreaming processing step, when there may be an interruption of a downstream processing step.

In a seventh aspect, an output stream of sticks derived from a log source, said sticks being of substantially equal or substantially constant or consistent longitudinal length and of a substantially consistent dimensionality with respect to cross-sectional profile (such as a width and a thickness), are subjected to a moisture removal step to substantially reduce a moisture content of each stick of said stream of sticks.

Preferably, the moisture removal step comprises diverting or directing or conveying said stream of sticks as an input stream of sticks to a dryer and retaining said sticks within said dryer for a pre-determined period of time sufficient to remove or reduce the moisture content of said sticks to a notional moisture content value.

Preferably, an output stream of sticks of reduced moisture content relative to an input stream of sticks is received from said dryer.

Preferably, said output stream of sticks are at least partially conditioned or re-conditioned from a minimum moisture content level achieved within said dryer by a partial uptake of moisture yielded from an input or incoming stream of sticks.

Preferably, said output stream of sticks has moisture removed in a drying operation.

Preferably, said output stream of sticks are directed (e.g. by conveyance) to be subjected to a dryer or a drying operation or a moisture conditioning routine of said output stream of sticks.

Preferably, said output stream of sticks have moisture removed or reduced down to a level of about 12 weight % or to less than about 12 weight % (being on a weight basis of a dry stick).

Preferably, a drying operation is a counter-flow dryer.

Preferably, a plurality of sticks from said output stream of sticks are aggregated into an arrangement on racks.

Preferably, a plurality of said racks are provided a stacked assembly of multiple rack layers as a pallet.

Preferably, said pallet is advanced into a drying operation, and a drying airflow or gas flow stream is directed as a flow path to pass from said pallet advancing into a dryer toward a pallet exiting from said dryer.

Preferably, said airflow or said gas flow directs moisture removed from the sticks of the advancing pallet and directs at least some of said moisture toward sticks of said pallet existing from said dryer.

Preferably, moisture from sticks being advanced into a dryer are directed to sticks being exited from said dryer as a conditioning or re-conditioning step of said sticks being exited.

Preferably, moisture removed from the sticks, or the resultant moisture content of said dried sticks, is sufficient to reduce downstream energy requirements for heat treatment or heat curing of adhesives which may be utilised in joints made (whether as end-wise joined joints, such as finger joints, or as face-to-face type joints, such as in a lamination). For example, a temperature of adhesive curing may be about 100° C. or may be less, depending on the adhesive stock to be used.

Preferably, said stream of sticks is a stream of sticks procured from any one or more of the first, second, third, fourth, fifth, sixth aspects as described above.

Preferably, the process for drying sticks further comprises or is defined by PCT/NZ2010/000228 the contents of which are hereby incorporated by reference.

In a further embodiment, in relation to the seventh aspect, in some embodiments, one or more of said substantially moisture reduced content sicks may be accumulated, optionally being a temporary accumulation or temporary store, for provision to a subsequent processing step. Advantageously, said accumulation or store of substantially moisture reduced content sticks being drawn upon or selected for a downstream subsequent processing step when there may be an interruption of an upstream processing step. Alternatively, said accumulation or store may be utilised to facilitate a continuing of an upstreaming processing step, when there may be an interruption of a downstream processing step.

In an eighth aspect, said process comprises an output stream of sticks as provided from any one of the first, second, third, fourth, fifth, sixth aspects or from the seventh aspect as described above, are directed (e.g. by conveyance) to be subjected to a structural testing or structural vetting routine.

In a further embodiment, in relation to the eighth aspect, in some embodiments, one or more of said sticks may be accumulated, optionally being a temporary accumulation or temporary store, accumulated or stored, for provision to a subsequent processing step. Advantageously, said accumulation or store of sticks being drawn upon or selected for a downstream subsequent processing step when there may be an interruption of an upstream processing step. Alternatively, said accumulation or store may be utilised to facilitate a continuing of an upstreaming processing step, when there may be an interruption of a downstream processing step.

In a ninth aspect, there is provided a process for the structural testing or vetting routine of a stream of sticks comprising one or more of:
  a removal of sticks from said stream of sticks when defective as to a measured or determined or observed predetermined structural performance or characteristic (optionally, this may include visual appearance defects which are measured or determined or observed),
  a deflection testing of each (optionally dried) stick of said stream of sticks for match of a grading of said sticks as to shook stock,
  a bending test of each (optionally dried) stick of said stream of sticks (i.e. a longitudinal deflection) as to a minimum bending capability or characteristic,
  an end loading test (i.e. a longitudinal compression) as to a minimum end load capability or a load characteristic,
  a stick strength test as to a minimum strength capability or characteristic.

Preferably, said structural testing or vetting routine comprises one or more of:
  a removal of sticks from said stream of sticks when defective as to a measured or determined or observed predetermined structural performance or characteristic,
  a deflection testing of each (optionally dried) stick of said stream of sticks for match of a grading of said sticks as to shook stock,
  a bending test of each (optionally dried) stick of said stream of sticks (i.e. a longitudinal deflection) as to a minimum bending capability or characteristic,
  an end loading test (i.e. a longitudinal compression) as to a minimum end load capability or a load characteristic,
  a stick strength test as to a minimum strength capability or characteristic.

Preferably, each stick which passes said structural testing or structural vetting routine is directed (e.g. by conveyance) for a subsequent processing step.

Preferably, each stick which passes said structural testing or structural vetting routine is directed (e.g. by conveyance) are graded or characterised as to a structural testing or structural vetting routine test or measured result, and are directed (e.g. by conveyance) for subsequent processing.

Preferably, each stick which does not pass said structural testing or structural vetting routine is/are discarded or rejected from said process.

In a further embodiment, in relation to the ninth aspect, in some embodiments, one or more of said sticks which passes said structural testing or structural vetting routine may be accumulated, optionally being a temporary accumulation or temporary store, accumulated or stored, for provision to a subsequent processing step. Advantageously, said accumulation or store of sticks being drawn upon or selected for a downstream subsequent processing step when there may be an interruption of an upstream processing step. Alternatively, said accumulation or store may be utilised to facilitate a continuing of an upstreaming processing step, when there may be an interruption of a downstream processing step.

In a tenth aspect, there is provided a process comprising receiving an output stream of sticks for subsequent processing from said eighth or ninth aspects as described above.

In a further embodiment, in relation to the tenth aspect, in some embodiments, one or more of said sticks from said stream of sticks may be accumulated, optionally being a temporary accumulation or temporary store, accumulated or stored, for provision to a subsequent processing step. Advantageously, said accumulation or store of sticks being drawn upon or selected for a downstream subsequent processing step when there may be an interruption of an upstream processing step. Alternatively, said accumulation or store may be utilised to facilitate a continuing of an upstreaming processing step, when there may be an interruption of a downstream processing step. In an eleventh aspect, there is provided a process for the accumulation of sticks, wherein a received stream of uniquely pre-graded or pre-profiled or pre-characterised sticks, individual sticks of the stream of sticks are diverted to a storage or holding bay or other facility for collecting a plurality of sticks of a substantially similar profile or grade or of sticks of a profile or grade falling within a particular pre-determined range of performance or characteristic requirements, to facilitate an accumulation of such sticks for subsequent delivery to the process or for procurement from the storage or holding bay of one or a plurality of sticks from one or more of said storage or holding bays of the same or different profile or grading for use in subsequent processing.

Preferably, wherein a predetermined selection of a plurality of same or differently as-graded or pre-graded or pre-profiled or pre-characterised sticks is made of a store or accumulation of sticks is made, and said selection of sticks is directed to (e.g. by conveyance) for a subsequent processing step.

Preferably, said as-graded or characterised sticks are uniquely separated and uniquely accumulated or stored with substantially similarly graded or characterised sticks for a subsequent processing step.

Preferably, said accumulator is receivable of a stream of uniquely pre-graded or pre-profiled sticks, individual sticks of the stream of sticks being diverted to a storage or holding bay or other facility for collecting a plurality of sticks of a substantially similar profile or grade or of sticks of a profile or grade falling within a particular pre-determined range of performance or characteristic requirements, to facilitate an accumulation of such sticks for subsequent delivery to the process or for procurement from the storage or holding bay of one or a plurality of sticks from one or more of said storage or holding bays of the same or different profile or grading for use in subsequent processing.

Preferably, wherein a predetermined selection of a plurality of same or differently as-graded or pre-graded or pre-profiled or pre-characterised sticks is made of a store or accumulation of sticks is made, and said selection of sticks is directed to (e.g. by conveyance) for a subsequent processing step.

Preferably, said predetermined selection is of pre-defined quantity of sticks from the same as-graded or pre-graded or pre-profiled or pre-characterised store or accumulation, and provided as a group of sticks for a subsequent processing step.

Preferably, said subsequent processing step is applied to the sticks of said group, the sticks of said group being conveyed sequentially (e.g. are conveyed and processed in a linear manner).

Preferably, said subsequent processing step comprises an end-wise stick jointing operation.

Preferably, said end-wise stick jointing operation is a finger jointing stage for finger jointing a tail of a leading stick with a head of a trailing stick.

Preferably, of the group of sticks, a first leading stick has only a tail finger jointed with a following stick, and a final trailing stick has only a head finger jointed with an immediately leading stick, with each of the sticks intermediate thereof being finger jointed with each of an immediately leading stick and an immediately trailing stick thereof.

Preferably, said finger joint may comprise an adhesive applied previously to finger joint cut respective ends of each said stick of said group.

Preferably, the adhesive may be any suitable adhesive for joining or sticking or adhering lumber surfaces to each other or for forming an adhesive joint.

Preferably, once end-wise joined together said group of sticks is formed into a composite stick.

In a twelfth aspect, there is provided a process for the end-wise finger jointing of a plurality of sticks to each other, wherein a selection of sticks are directed to have fingers made at an end of each stick, or each end of each said stick.

Preferably, of said sticks to be finger jointed, at least some are to be provided with fingers made at each end (i.e. both ends), said process comprising finger jointing each end of a stick simultaneously.

Preferably, a finger jointer (or finger shaper) is with provided with a pair of cutting heads configured to cut fingers at each end of the same stick in a single pass.

Preferably, of said sticks to be finger jointed, all of said sticks provided as a single packet are provided with fingers made at each end (i.e. both ends), said process comprising finger jointing each end of each of said sticks simultaneously.

Preferably, said selection of sticks are collated and provided as a group or a single packet of sticks to said finger jointer (of finger shaper) so as to make said fingers (or shape said fingers) of multiple stick ends in a single pass.

Preferably, said selection of sticks are provided as a group or a single packet of sticks to said finger jointer (of finger shaper) so as to make said fingers (or shape said fingers) of both ends of multiple sticks in a single pass.

Preferably, each stick of said selection of sticks has a substantially constant or similar thickness.

Preferably, each stick of said selection of sticks has a substantially constant or similar cross-sectional profile or dimensions.

Preferably, wherein said selection of sticks are end-wise assembled together via end-wise joining to provide for an assembled composite of a series of sticks being of greater longitudinal length than each of said individual sticks.

Preferably, wherein a first selective combination of as-graded or pre-graded or pre-profiled or pre-characterised sticks are assembled into a first composite or an assembled composite stick of a predetermined length, for provision in a subsequent processing step.

Preferably, wherein a second or subsequent selective combinations of as-graded or pre-graded or pre-profiled sticks are assembled into a second composite or a subsequent composite or second or subsequent assembled composite stick of a predetermined length, for provision in a subsequent processing step.

Preferably, wherein a combination of sticks is/are assembled by joining two or more as-graded sticks together, the joining preferentially being a finger-jointing operation of longitudinal ends of the as-graded sticks to procure an assembled composite stick.

Preferably, wherein said finger jointing includes an adhesive provided to said finger joint (i.e. said adhesive being a pressure sensitive adhesive).

Preferably, wherein said finger jointing operates on a continuous basis to produce a continuous length of finger jointed assembled stick.

Preferably, said continuous length of finger jointed assembled sticks are cut to a length.

Preferably, the length is a pre-determined or pre-defined length.

In a further embodiment, in relation to the twelfth aspect, in some embodiments, one or more of said sticks which passes said structural testing or structural vetting routine may be accumulated, optionally being a temporary accumulation or temporary store, accumulated or stored, for provision to a subsequent processing step. Advantageously, said accumulation or store of sticks being drawn upon or selected for a downstream subsequent processing step when there may be an interruption of an upstream processing step. Alternatively, said accumulation or store may be utilised to facilitate a continuing of an upstreaming processing step, when there may be an interruption of a downstream processing step.

In a thirteenth aspect, there is provided a process according to any one of the tenth, eleventh or twelfth aspects described above, wherein a or the composite stick formed of a group of sticks is of a known collection of sticks of previously pre-determined grade or profile or characterisation.

In a further embodiment, in relation to the thirteenth aspect, in some embodiments, one or more of said composite sticks so formed may be accumulated, optionally being a temporary accumulation or temporary store, accumulated or stored, for provision to a subsequent processing step. Advantageously, said accumulation or store of composite sticks being drawn upon or selected for a downstream subsequent processing step when there may be an interruption of an upstream processing step. Alternatively, said accumulation or store may be utilised to facilitate a continuing of an upstreaming processing step, when there may be an interruption of a downstream processing step.

In a fourteenth aspect, there is provided a process for a serially produced lamina into a laminate, wherein said process comprises selectively combining of two or more of assembled composite sticks along a longitudinal side surface or face of each said composite stick, into a multi-layer composite arrangement.

In a further embodiment, in relation to the fourteenth aspect, in some embodiments, one or more of said composite sticks may be sourced or obtained from an accumulation or store, optionally being a temporary accumulation or temporary store, accumulated or stored, for provision to a subsequent processing step. Advantageously, said accumulation or store of composite sticks being drawn upon or selected for a downstream subsequent processing step when there may be an interruption of an upstream processing step. Alternatively, said accumulation or store may be utilised to facilitate a continuing of an upstreaming processing step, when there may be an interruption of a downstream processing step.

Preferably, an assembled composite stick is serially advanced in a longitudinal manner to a feed end of a press.

Preferably, an adhesive is applied to at least one longitudinal side surface or face, said longitudinal side surface or face comprising of said adhesive to be brought into facing contact with a more advanced assembled composite stick of an opposing longitudinal side surface or face of said more advanced assembled composite stick.

Preferably, the adhesive is applied to the at least one longitudinal side surface or face when said face is substantially horizontal (and said face is facing substantially upwards).

Preferably, said composite stick comprising of adhesive applied to said side surface or face is maintained in an orientation to which said adhesive was applied, and conveyed or delivered to the feed end of the press in said orientation.

Preferably, the composite stick comprising of said adhesive is held in said orientation for a predetermined period of time, prior to said side surface or face comprising of said adhesive being brought into facing contact with a more advanced assembled composite stick.

Preferably, said predetermined period of time is a period of time sufficient for said adhesive to substantially achieve one or more of a predetermined: adhesive tack, peel strength, shear strength.

Preferably, said adhesive is a pressure sensitive adhesive or a heat cured adhesive.

Preferably, said composite stick delivered to the feed end of the press is substantially axially rotated so as to bring said side surface of face comprising of said applied adhesive into facing contact with a more advanced assembled composite stick.

Preferably, a more advanced composite stick feed into said press is of an orientation ready to receive a subsequent or trailing composite stick in a face-to-face manner.

Preferably, wherein a sequential layup of assembled composite sticks combines to form a multi-layer composite arrangement or construct by adherence of adjacent longitudinally facing side surfaces or faces of each composite stick which are brought together.

Preferably, wherein a selective combination of two or more of the assembled composite sticks are pressed together along a longitudinal facing side surfaces or faces of said selective combination, being pressed at a predetermined pressure or pressurising force.

Preferably, wherein the selective combination of two or more of the assembled composite sticks are pressed together for a predetermined period of time.

Preferably, the predetermined period of time is sufficient for the adhesive to cure or set.

Preferably, the selective combination of two or more of the assembled composite sticks are pressed together and exposed to a predetermined temperature.

Preferably, the predetermined temperature is a temperature sufficient to cure the adhesive.

Preferably, wherein the predetermined temperature is an elevated temperate sufficient to enable a curing of adhesive previously applied.

Preferably, wherein the selective combination of two or more of the assembled composite sticks are pressed together and exposed to an energy source capable of initiating or facilitating a curing of adhesive previously applied.

Preferably, the energy source is one or more of: infra-red, micro-wave, radiofrequency, heated platens (such as heated by electrical heaters, hot oil, hot water or other working fluids), elevated temperatures, other energy sources for curing an adhesive.

Preferably, the selective combination of assembled composite sticks are face joined to each other to form a laminate product.

Preferably, a plurality of groups of said selective combinations of assembled composite sticks are serially advanced into said press.

Preferably, a dry face is provided between each group of a selective combination of assembled sticks (i.e. at least two adjoining faces of composite sticks are devoid of adhesive, so as to provide for a dry joint or a non-adhesive joint between a group of selectively combined assembled sticks.

Preferably, at least a portion of a group of a selective combination of assembled sticks are advanced into or more advanced within the press relative to subsequent composite sticks of a selective combination of composite sticks to form a group.

Preferably, a laminate product is sequentially assembled by introducing or feeding sequenced individual composite sticks into the press, wherein composite sticks forming a portion of a laminate product to be formed are held and retained within the press whilst subsequent composite sticks to be laminated to advanced composite sticks remain outside of the press, awaiting feeding into the press.

Preferably, a laminate product to be formed in said press is sequentially formed by sequential layup of composite sticks as laminae of said laminate product to be formed by a serially delivering individual composite sticks to a feed of said press.

Preferably, said laminate product to be formed is sequentially formed by the sequential joining of laminae to laminae, optionally wherein advanced laminae (being individual composite sticks) of a laminate product are serially joined together by the serial provision of individual composite sticks of a group of selected combination of composite sticks.

Preferably, said press comprises a plurality of groups of selective composite sticks, each said group forming an individual laminate product.

Preferably, a plurality of individual laminate products reside simultaneously within said press.

Preferably, each individual laminate product is advanced incrementally through said press by a dimension (such as a thickness) or each separate composite stick being advanced into the feed end of said press.

Preferably, each individual laminate product is incrementally advanced through said press by a dimension according to the dimension of a sequentially fed composite stick being imputed or fed into the feed end of said press.

Preferably, each individual laminate product is incrementally advanced out of an outlet of said press according to the dimension of a sequentially fed composite stick being imputed or fed into the feed end or inlet of said press.

Preferably, said laminate product is finished as to final appearance and/or dimension (such as such as by subjecting said product to one or more of: a thicknesser, a gauger, a cutter; for adjusting one or more of: length, width, thickness; of said product).

Preferably, said product is subject to a determination of product quality parameter (such as to a minimum strength requirement, a minimum bending requirement, or another a predetermined physical characteristic of each product so formed).

Preferably, said determination of said product quality provides a measured assessment as to meeting minimum product quality parameters.

In a fifteenth aspect, there is provided a process for the production of a laminate wood product comprising:
providing a source of wood or log material;
generating a plurality of individual sticks procured from said source, each of said individual sticks being of a substantially constant dimension (the dimension of said stick being substantially constant as to length, width and thickness); and
adjusting individual sticks as to one or more of:
moisture content (such as by subjecting said individual sticks to a drying and/or moisture conditioning step),
dimension (such as by subjecting said individual sticks to one or more of: a thicknesser, a gauger, a cutter; for adjusting one or more of: length, width, thickness; of said individual sticks;
determining quality parameters (such as to a minimum strength requirement, a minimum bending requirement, or another a predetermined physical characteristic of each individual stick), and determining if an individual stick is to be rejected or discarded from said process, or if an individual stick is to be progressed through said process; and
accumulating said individual sticks, said individual sticks accumulated into separate groups, individual sticks of each group comprising of a predetermined quality parameter or parameters falling within a selected range of said predetermined quality parameter(s),
selecting a predetermined number of sticks from an accumulated group of sticks and end-wise joining the selected sticks to each other to produce an end-wise jointed stick,
joining of two or more (or three or more, or a plurality) of said end-wise jointed sticks to each other about a major surface of each end-wise jointed stick to produce a series of end-wise jointed sticks laminated together into a product.

Preferably, wherein said individual sticks are adjusted to be of a substantially similar or substantially constant cross-sectional profile (said cross-sectional profile being as to a thickness and a width of said stick).

Preferably, wherein said product is surface finished as to final appearance and/or dimension (such as such as by subjecting said product to one or more of: a thicknesser, a gauger, a cutter; for adjusting one or more of: length, width, thickness; of said product).

Preferably, wherein said product is subject to a determination of product quality parameter (such as to a minimum strength requirement, a minimum bending requirement, or another a predetermined physical characteristic of each product so formed).

Preferably, wherein said determination of said product quality provides for a qualitative assessment as to meeting minimum product quality parameters.

Preferably, wherein the major surfaces of two or more end-wise jointed sticks are joined by lamination or an adhesive lamination process.

Preferably, wherein said lamination process comprises a press for applying a lamination pressure.

Preferably, wherein said lamination process comprises an adhesive curing stage.

Preferably, wherein said adhesive curing stage comprises one or more of: infra-red, micro-wave, radiofrequency, heated platens (such as heated by electrical heaters, hot oil, hot water or other working fluids), elevated temperatures, other energy sources for curing an adhesive provided upon the major faces.

In a sixteenth aspect, there is provided a process for the treatment of a laminate wood product produced from a serially arranged layout of lamina, comprising the steps of:

in a first step, subjecting the entirety of the laminate wood product to a wood treatment or preservative composition within a spray booth, and then in a second step, subjecting the entirety of the laminate wood product received from the first step by submerging the laminate wood product in a bath of a wood treatment composition.

Preferably, wherein the second step is a conditioning or re-conditioning step for increasing a relative moisture content of the laminate wood product.

Floating Grade Point

In another aspect, there is provided a method of accumulating individual sticks procured from a source of wood or log material and aggregating a plurality of said individual sticks into groups, said method comprising:
  determining (e.g. by measurement) one or more physical parameter(s) or qualities of an individual stick,
  attributing a prescribed value (or other quantifier) to each individual stick based on said determination (e.g. by measurement) of said one or more physical parameter(s) or qualities of said stick which fall within a predetermined range,
  accumulating together sticks of the same prescribed value into separate groups, and
  adjusting the predetermined range to vary the prescribed value to be attributed to a subsequently determined individual stick or sticks by adjusting one or more of:
    said range,
    a lower limit of said range,
    an upper limit of said range.

Preferably, each group comprises sticks of the same prescribed value or within a range of said prescribed value.

Preferably, there may be more than three groups.
Preferably, there may be more than five groups.
Preferably, there may be more than ten groups.
Preferably, there may be nine groups.
Preferably, there may be five groups.
Preferably, there may be three groups.

Preferably, one or more of said range or said lower limit of said range or said upper limit of said range, for each said group, is adjusted based on adjusting an upper bound and a lower bound of said prescribed value (or quantifier) of a predetermined number of sticks received for a subsequent processing.

Preferably, said range, for each said group, is adjusted by adjusting an upper bound and a lower bound of said prescribed value (or quantifier) of a predetermined number of sticks received for a subsequent processing.

Preferably, said range, for each said group, is adjusted by adjusting an upper bound and a lower bound of said prescribed value (or quantifier) of the sticks of each group, the upper bound and a lower bound based on a predetermined number of sticks received for a subsequent processing.

Preferably, said adjusting or adjustment is determined on a stick-by-stick basis.

Preferably, said predetermined number of sticks is a stick count of more than about 10 sticks, or more than about 100 sticks, or more than about 250 sticks, or more than about 500 sticks, or more than about 1,000 sticks, or more than about 2,000 sticks, or more than about 5,000 sticks, or more than about 10,000 sticks.

Preferably, said adjusting or adjustment is based on a stick count of a stream of sticks or the last 10 sticks counted, or more than about the last 100 sticks counted, or more than about 250 sticks, or more than about 500 sticks, or more than about 1,000 sticks, or more than about 2,000 sticks, or more than about 5,000 sticks, or more than about the last 10,000 sticks counted.

Preferably, said adjusting or adjustment is based on a predetermined period of production or processing, such as for example the last 10 minutes or the last 20 minutes, or the last 30 minutes, or the last 40 minutes, or the last 50 minutes, or the last 60 minutes of production or processing or of sticks.

Preferably, said predetermined number of sticks is a stick count of about 10 sticks, or about 100 sticks, or about 250 sticks, or about 500 sticks, or about 1,000 sticks, or about 2,000 sticks, or about 5,000 sticks, or about 10,000 sticks.

Preferably, said adjusting or adjustment is made so that each group of the separate groups receives a predetermined proportion of the plurality of sticks procured from said source of wood or log material.

Preferably, there is a count or an assessment of the number or quantity of sticks in each grade, and said adjusting or adjustment is carried out dynamically so as to provide for a balance or balanced proportion or a pre-determined proportion of sticks to be accumulated into each grade as a result of the prescribed value attributed to each stick.

Preferably, wherein each group receives the same or a similar proportion.

Preferably, wherein one or more of the groups receives a different or dissimilar proportion.

Preferably, wherein one or more of the groups receives the same or a similar proportion as the other groups.

Preferably, wherein at least one (or one) of the group(s) receives a different or dissimilar proportion of the plurality of sticks, and remaining groups receive the same or a similar proportion as each of those remaining groups.

Preferably, wherein each group is representative of a range of sticks (i.e. having the same prescribed value (or other quantifier) or being within a predetermined range of a prescribed value (or other quantifier)).

Preferably, said adjusting or adjustment is performed dynamically based on a stick count or based on the predetermined number of sticks.

Preferably, relative proportions of the quantity of sticks accumulated into each group is sufficient so as to provide for a collation of sticks, each stick being of a prescribed value (or other quantifier), for the subsequent selective combination of sticks from each individual group for re-assembly into a composite stick.

Preferably, said composite stick is assembled from individual sticks from the same group.

Preferably, a plurality of composite sticks are to be assembled, each assembled composite stick being derived of individual sticks from an individual group.

Preferably, a plurality of separate composite sticks are to be provided from different or separate groups. More specifically, a first composite stick is to be provided from assembly of sticks from a first group, while a second composite stick is to be provided from assembly of sticks from a second group, and so on.

Preferably, said a composite stick is to be provided as an individual laminae of a laminate product.

In another aspect, there is provided a process comprising receiving an output stream of sticks for subsequent processing, using the sticks with an attributed prescribed value (or other quantifier) as defined above.

In another aspect, there is provided a process for the accumulation of the sticks as defined above,
  wherein a received stream of uniquely pre-graded or pre-profiled or pre-characterised sticks, individual sticks of the stream of sticks are diverted to a storage or holding bay or other facility for collecting a plurality of sticks of a substantially similar profile or grade or of sticks of a profile or grade falling within a particular pre-determined range of performance or characteristic requirements, to facilitate an accumulation of such sticks for subsequent delivery to the process or for procurement from the storage or holding bay of one or a plurality of sticks from one or more of said storage or holding bays of the same or different profile or grading for use in subsequent processing.

Preferably, wherein a predetermined selection of a plurality of same or differently as-graded or pre-graded or pre-profiled or pre-characterised sticks is made of a store or accumulation of sticks is made, and said selection of sticks is directed to (e.g. by conveyance) for a subsequent processing step.

Preferably, said as-graded or characterised sticks are uniquely separated and uniquely accumulated or stored with substantially similarly graded or characterised sticks for a subsequent processing step.

Preferably, said accumulator is receivable of a stream of uniquely pre-graded or pre-profiled sticks,
  individual sticks of the stream of sticks being diverted to a storage or holding bay or other facility for collecting a plurality of sticks of a substantially similar profile or grade or of sticks of a profile or grade falling within a particular pre-determined range of performance or characteristic requirements,
  to facilitate an accumulation of such sticks for subsequent delivery to the process or for procurement from the storage or holding bay of one or a plurality of sticks from one or more of said storage or holding bays of the same or different profile or grading for use in subsequent processing.

Preferably, wherein a predetermined selection of a plurality of same or differently as-graded or pre-graded or pre-profiled or pre-characterised sticks is made of a store or accumulation of sticks is made, and said selection of sticks is directed to (e.g. by conveyance) for a subsequent processing step.

Preferably, said predetermined selection is of pre-defined quantity of sticks from the same as-graded or pre-graded or pre-profiled or pre-characterised store or accumulation, and provided as a group of sticks for a subsequent processing step.

Preferably, said subsequent processing step is applied to the sticks of said group, the sticks of said group being conveyed sequentially (e.g. are conveyed and processed in a linear manner).

Preferably, said subsequent processing step comprises an end-wise stick jointing operation.

Preferably, said end-wise stick jointing operation is a finger jointing stage for finger jointing a tail of a leading stick with a head of a trailing stick.

Preferably, of the group of sticks, a first leading stick has only a tail finger jointed with a following stick, and a final trailing stick has only a head finger jointed with an immediately leading stick, with each of the sticks intermediate thereof being finger jointed with each of an immediately leading stick and an immediately trailing stick thereof.

Preferably, said finger joint may comprise an adhesive applied previously to finger joint cut respective ends of each said stick of said group.

Preferably, the adhesive may be any suitable adhesive for joining or sticking or adhering lumber surfaces to each other or for forming an adhesive joint.

Preferably, once end-wise joined together said group of sticks is formed into a composite stick.

In another aspect, there is provided a process for the end-wise finger jointing of a plurality of sticks to each other, wherein a selection of sticks are directed to have fingers made at an end of each stick, or each end of each said stick.

Preferably, of said sticks to be finger jointed, at least some are to be provided with fingers made at each end (i.e. both ends), said process comprising finger jointing each end of a stick simultaneously.

Preferably, a finger jointer (or finger shaper) is with provided with a pair of cutting heads configured to cut fingers at each end of the same stick in a single pass.

Preferably, of said sticks to be finger jointed, all of said sticks provided as a single packet are provided with fingers made at each end (i.e. both ends), said process comprising finger jointing each end of each of said sticks simultaneously.

Preferably, said selection of sticks are collated and provided as a group or a single packet of sticks to said finger jointer (of finger shaper) so as to make said fingers (or shape said fingers) of multiple stick ends in a single pass.

Preferably, said selection of sticks are provided as a group or a single packet of sticks to said finger jointer (of finger shaper) so as to make said fingers (or shape said fingers) of both ends of multiple sticks in a single pass.

Preferably, each stick of said selection of sticks has a substantially constant or similar thickness.

Preferably, each stick of said selection of sticks has a substantially constant or similar cross-sectional profile or dimensions.

Preferably, wherein said selection of sticks are end-wise assembled together via end-wise joining to provide for an assembled composite of a series of sticks being of greater longitudinal length than each of said individual sticks.

Preferably, wherein a first selective combination of as-graded or pre-graded or pre-profiled or pre-characterised sticks are assembled into a first composite or an assembled composite stick of a predetermined length, for provision in a subsequent processing step.

Preferably, wherein a second or subsequent selective combinations of as-graded or pre-graded or pre-profiled sticks are assembled into a second composite or a subsequent composite or second or subsequent assembled composite stick of a predetermined length, for provision in a subsequent processing step.

Preferably, wherein a combination of sticks is/are assembled by joining two or more as-graded sticks together, the joining preferentially being a finger-jointing operation of longitudinal ends of the as-graded sticks to procure an assembled composite stick.

Preferably, wherein said finger jointing includes an adhesive provided to said finger joint (i.e. said adhesive being a pressure sensitive adhesive).

Preferably, wherein said finger jointing operates on a continuous basis to produce a continuous length of finger jointed assembled stick.

Preferably, said continuous length of finger jointed assembled sticks are cut to a length.

Preferably, the length is a pre-determined or pre-defined length.

In another aspect, there is provided a process according to any one of the aspects described above, wherein a or the composite stick formed of a group of sticks is of a known collection of sticks of previously pre-determined grade or profile or characterisation.

In another aspect, there is provided a process for a serially produced lamina into a laminate, wherein said process comprises selectively combining of two or more of assembled composite sticks along a longitudinal side surface or face of each said composite stick, into a multi-layer composite arrangement.

Preferably, an assembled composite stick is serially advanced in a longitudinal manner to a feed end of a press.

Preferably, an adhesive is applied to at least one longitudinal side surface or face, said longitudinal side surface or face comprising of said adhesive to be brought into facing contact with a more advanced assembled composite stick of an opposing longitudinal side surface or face of said more advanced assembled composite stick.

Preferably, the adhesive is applied to the at least one longitudinal side surface or face when said face is substantially horizontal (and said face is facing substantially upwards).

Preferably, said composite stick comprising of adhesive applied to said side surface or face is maintained in an orientation to which said adhesive was applied, and conveyed or delivered to the feed end of the press in said orientation.

Preferably, the composite stick comprising of said adhesive is held in said orientation for a predetermined period of time, prior to said side surface or face comprising of said adhesive being brought into facing contact with a more advanced assembled composite stick.

Preferably, said predetermined period of time is a period of time sufficient for said adhesive to substantially achieve one or more of a predetermined: adhesive tack, peel strength, shear strength.

Preferably, said adhesive is a pressure sensitive adhesive or a heat cured adhesive.

Preferably, said composite stick delivered to the feed end of the press is substantially axially rotated so as to bring said side surface of face comprising of said applied adhesive into facing contact with a more advanced assembled composite stick.

Preferably, a more advanced composite stick feed into said press is of an orientation ready to receive a subsequent or trailing composite stick in a face-to-face manner.

Preferably, wherein a sequential layup of assembled composite sticks combines to form a multi-layer composite arrangement or construct by adherence of adjacent longitudinally facing side surfaces or faces of each composite stick which are brought together.

Preferably, wherein a selective combination of two or more of the assembled composite sticks are pressed together along a longitudinal facing side surfaces or faces of said selective combination, being pressed at a predetermined pressure or pressurising force.

Preferably, wherein the selective combination of two or more of the assembled composite sticks are pressed together for a predetermined period of time.

Preferably, the predetermined period of time is sufficient for the adhesive to cure or set.

Preferably, the selective combination of two or more of the assembled composite sticks are pressed together and exposed to a predetermined temperature.

Preferably, the predetermined temperature is a temperature sufficient to cure the adhesive.

Preferably, wherein the predetermined temperature is an elevated temperate sufficient to enable a curing of adhesive previously applied.

Preferably, wherein the selective combination of two or more of the assembled composite sticks are pressed together and exposed to an energy source capable of initiating or facilitating a curing of adhesive previously applied.

Preferably, the energy source is one or more of: infra-red, micro-wave, radiofrequency, heated platens (such as heated by electrical heaters, hot oil, hot water or other working fluids), elevated temperatures, other energy sources for curing an adhesive.

Preferably, the selective combination of assembled composite sticks are face joined to each other to form a laminate product.

Preferably, a plurality of groups of said selective combinations of assembled composite sticks are serially advanced into said press.

Preferably, a dry face is provided between each group of a selective combination of assembled sticks (i.e. at least two adjoining faces of composite sticks are devoid of adhesive, so as to provide for a dry joint or a non-adhesive joint between a group of selectively combined assembled sticks.

Preferably, at least a portion of a group of a selective combination of assembled sticks are advanced into or more advanced within the press relative to subsequent composite sticks of a selective combination of composite sticks to form a group.

Preferably, a laminate product is sequentially assembled by introducing or feeding sequenced individual composite sticks into the press, wherein composite sticks forming a portion of a laminate product to be formed are held and retained within the press whilst subsequent composite sticks to be laminated to advanced composite sticks remain outside of the press, awaiting feeding into the press.

Preferably, a laminate product to be formed in said press is sequentially formed by sequential layup of composite sticks as laminae of said laminate product to be formed by a serially delivering individual composite sticks to a feed of said press.

Preferably, said laminate product to be formed is sequentially formed by the sequential joining of laminae to laminae, optionally wherein advanced laminae (being individual composite sticks) of a laminate product are serially joined together by the serial provision of individual composite sticks of a group of selected combination of composite sticks.

Preferably, said press comprises a plurality of groups of selective composite sticks, each said group forming an individual laminate product.

Preferably, a plurality of individual laminate products reside simultaneously within said press.

Preferably, each individual laminate product is advanced incrementally through said press by a dimension (such as a thickness) or each separate composite stick being advanced into the feed end of said press.

Preferably, each individual laminate product is incrementally advanced through said press by a dimension according to the dimension of a sequentially fed composite stick being imputed or fed into the feed end of said press.

Preferably, each individual laminate product is incrementally advanced out of an outlet of said press according to the dimension of a sequentially fed composite stick being imputed or fed into the feed end or inlet of said press.

Preferably, said laminate product is finished as to final appearance and/or dimension (such as such as by subjecting said product to one or more of: a thicknesser, a gauger, a cutter; for adjusting one or more of: length, width, thickness; of said product).

Preferably, said product is subject to a determination of product quality parameter (such as to a minimum strength requirement, a minimum bending requirement, or another a predetermined physical characteristic of each product so formed).

Preferably, said determination of said product quality provides a measured assessment as to meeting minimum product quality parameters.

In a further embodiment, in relation to any one of the above aspects, in some embodiments, one or more of said sticks or composite sticks or individual laminate product may be accumulated, optionally being a temporary accumulation or temporary store, accumulated or stored, for provision to a subsequent processing step. Advantageously, said accumulation or store may be drawn upon or selected for a downstream subsequent processing step when there may be an interruption of an upstream processing step. Alternatively, said accumulation or store may be utilised to facilitate a continuing of an upstreaming processing step, when there may be an interruption of a downstream processing step.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term "and/or" means "and" or "or", or both.

As used herein "(s)" following a noun means the plural and/or singular forms of the noun.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The disclosure consists in the foregoing and also envisages constructions of which the following gives examples only. Features disclosed herein may be combined into new embodiments of compatible components addressing the same or related inventive concepts. For example, a retention mechanism of one illustrated embodiment may be combined with a patient interface having an air delivery side and collapsible wall of a cannula of another illustrated embodiment. Likewise, one embodiment of a collapsible wall on the air delivery side can be combined with another embodiment of a collapsible wall on the other side, or a non-air delivery side as necessary.

BRIEF DESCRIPTION OF THE FIGURES

Preferred embodiments of the disclosure will be described by way of example only and with reference to the following drawings.

Figure 1:
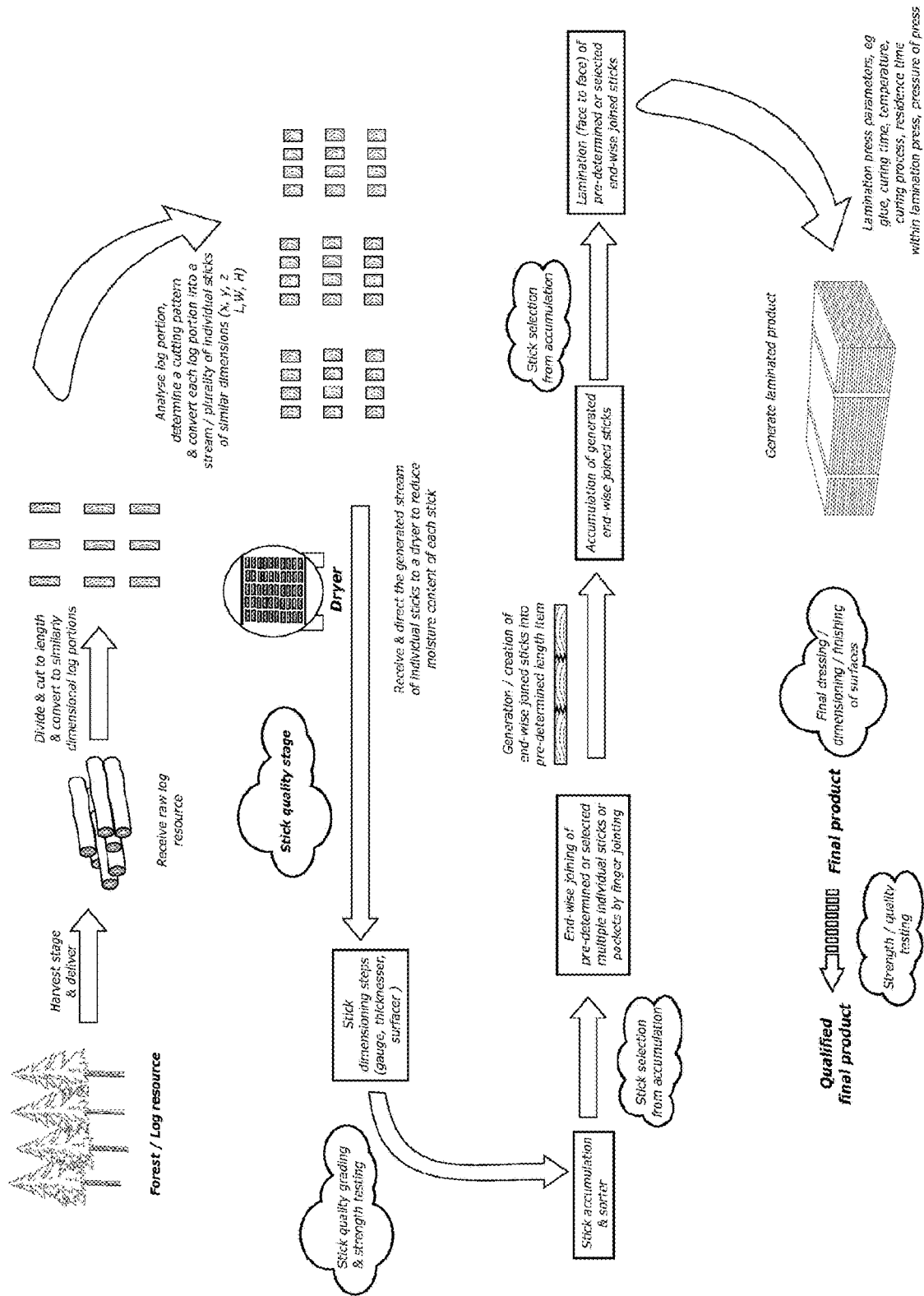
FIG. 1 illustrates an exemplary process flow for break-down of a log source through to assembly of a laminate product formed of a laminae of composite sticks.

It will be appreciated that where a sequence of individual steps are provided, these may be conducted alone in combination with other outlined steps as described herein.

DETAILED DESCRIPTION

Various embodiments are described with reference to the Figures. Throughout the Figures and specification, the same reference numerals may be used to designate the same or similar components, and redundant descriptions thereof may be omitted.

FIG. 1 shows an exemplary process flow for break-down of a log source through to assembly of a laminate product formed of a laminae of composite sticks.

Figure 2:
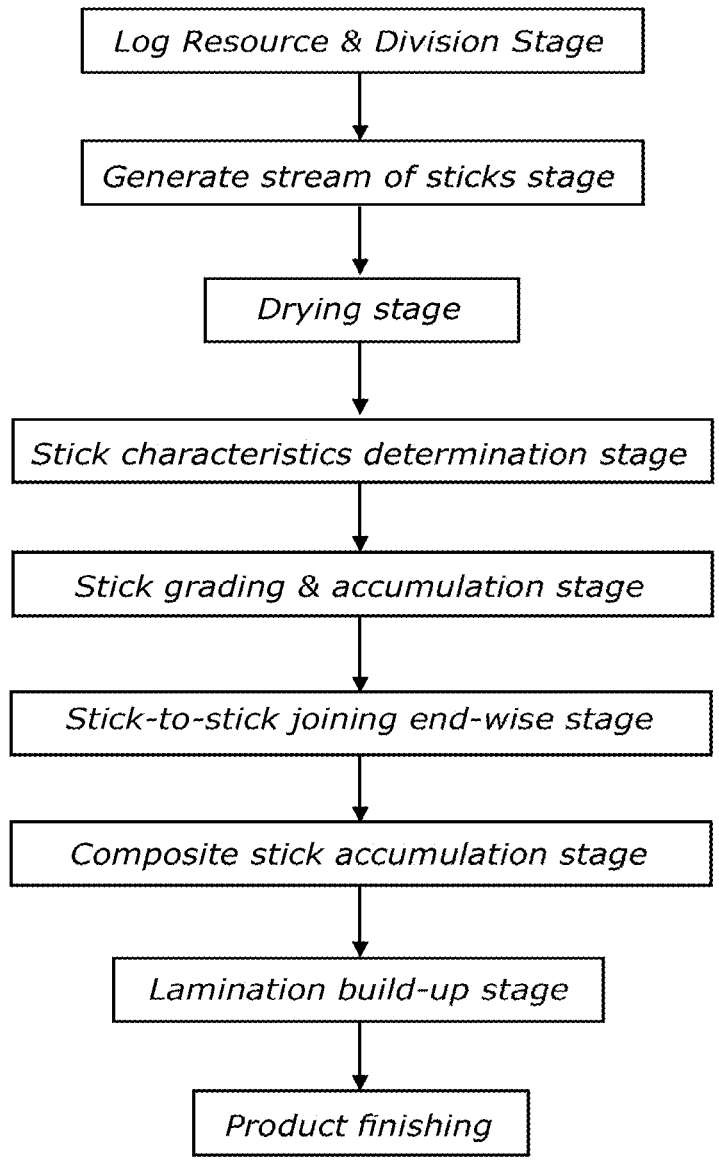
FIG. 2 sets out a process flow diagram, illustrating a sequence of individual steps or stages which may be conducted for the production of a final product.

FIG. 2 illustrates a process flow diagram setting out a sequence of steps in the production of a laminate product. Each of the individual steps may be conducted on their own or in combination with any of the other steps as described herein.

The provision of a process (and accompanying plant) capable of breaking down or utilising traditionally lower value log material for the manufacture of higher value structural lumber is an area of key interest. Reference to 'lower value' being typically or traditionally attributed to one or more of: shape of log (being non-straight), strength or other physical attribute of log, available length of log (where shorter lengths are less valuable than longer length), age of log (where lower age has traditionally been of lower value to structural lumber requirements).

The ability to provide a process and accompanying plant capable of processing such lower value log material (in addition to higher value log material if desired) and produce through, manufacturing and processing capabilities, an end product being of a higher value is of keen interest.

For example, forest or log resources, even with careful harvesting techniques and maintenance of the forest and log source during growth years, will inevitably still grow and produce some forest or log resource which does not meet strict requirements for use as structural lumber where structural lumber is harvested directedly from the wood stem or log itself by virtue of simple milling or cutting techniques to procure such lumber. Typically, a series of lengths of lumber can be obtained from a wood stem or log, the lengths obtainable being dependent on the shape (including bends and other growth artefacts such as knots) of the stem or log. The remainder of the stem or log then being divisible into other shorter lengths of lumber. And then the remainder after that may be converted to pulp for its cellulosic fibre or used for other purposes.

The ability to procure a high yield of structural lumber from a wood stem or log is highly dependent on the stem or log itself, and so the forest owner or harvester or the lumber mill are each effected as to their overall ability to supply or produce structural lumber from the available resource. Increasing the structural lumber for this part of the chain requires that greater forest be harvested in order to obtain more wood stem or log and to convert that increased harvest to lumber product. However, it does not address the constraint of structural lumber issue associated with the available resource or for making more effective use of the available resource.

Furthermore, economic benefits may be enhanced in the process as described herein, by the provision of one or more accumulation or store stations or buffers which allow for an accumulation or storage of material provided from an upstream processing step or stage, thereby facilitating for an on-going source of supply of such materials for subsequent processing steps or stages. Furthermore, where an issue may arise with a downstream processing step or stage, then such an accumulation or store may be beneficial in providing for the ability for an upstream processing step or stage to be continued uninterrupted, whilst the issue with the downstream processing step or stage is resolved.

The accumulations or stores can operate as buffer stations and may be fully automated so as to support a more continuous production process by helping ensure maximum plant up-time and smoothing peaks and dips in production rates. In this manner, some parts of the process or plant may be operated in a batch processing mode, whilst others are allowed to run continuously or semi-continuously. Provision of such capability is available for multiple work in progress units of measure (e.g. sticks or composite sticks and lamella) and may utilises automated stacking arrangements to minimise the space required to deploy or provide for an accumulation or store centre facility. Totally throughput capacity of the plant may be increased by provision of continuously operating units downstream of the accumulation or store or buffer than can be automatically deployed or operated in a manner so as to empty the previously built up accumulations or stores or buffers was still running the upstream machine centres at their rated speeds.

Accordingly, there is provided a process for the division or dividing of a source log (from a resource, such as a forest, where single species or multi-species) into one or a series of discrete longitudinal lengths for subsequent processing. The process comprises dividing (such as by cutting) a source log into a plurality of substantially consistent or substantially constant predetermined length log portions. The plurality of substantially consistent or substantially constant predetermined length log portions are provided for a subsequent processing step.

There is also provided a process for the division or dividing of a source log into discrete longitudinal lengths for subsequent processing, comprising simultaneously dividing a source log into a plurality of substantially consistent or substantially constant predetermined length log portions. The plurality of substantially consistent or substantially constant predetermined length log portions being provided for a subsequent processing step.

There is also provided a process for the division of an individual input source log into discrete longitudinal lengths for subsequent processing, wherein said process comprises:
  receiving an individual input source log,
  optionally, locating said individual input source log longitudinally, or advancing said individual input source log to a datum location, such as on a cutting deck or a support platform for a subsequent log division operation (optionally providing said input source log to said cutting deck or a support platform for the subsequent division in a singular lift or singular lift operation),
  optionally, restraining said individual input source log upon a cutting deck or a support platform, whether in a longitudinal direction (such as a log length or log end-wise) direction or in rotational or angular direction (such as to restrain said log from axial rotation), or both, for restraint during a subsequent log division operation,
  dividing the input source log into one or a plurality of output log portions of a predetermined length, wherein at least a portion of said output log portions resultant from said division are of a substantially equal or substantially constant or consistent longitudinal length, and wherein said substantially equal or substantially constant or consistent longitudinal length output log portions are procured as a feed stream of log material for a subsequent processing step. Optionally, the input source log may be divided into a plurality of output log portions simultaneously. Optionally, one or more of said predetermined length log portions provided for a subsequent processing step may be accumulated, optionally being a temporary accumulation or temporary store, for provision to a subsequent processing step. Advantageously, said accumulation or store of said predetermined length log portions being drawn upon or selected for a downstream subsequent processing step when there may be an interruption of an upstream processing step. Alternatively, said accumulation or store may be utilised to facilitate a continuing of an upstreaming processing step, when there may be an interruption of a downstream processing step.

There is also provided a process of the division or dividing an output log portion procured as a feed stream of log material for subsequent processing into a stream of a plurality of sticks, comprising:
  end mounting said output log portion (i.e. each/both end of said output log portion is end mounted),
  making selective cuts of said output log portion by two or more rotary saw blades operable at substantially 90 degrees with respect to each other thereby to make cuts to free an individual stick from the mounted output log portion, said two or more saw blades longitudinally movable with respect to the longitudinal length of said mounted output log portion via a carriage
  on command, axially rotating said output log portion either in association with the step of rotary cutting of said output log portion or rotating said output log portion in an interval between a rotary cutting of said output log portion,
  and the removal of each cut stick (optionally automatically or in an automated manner) from the mounted output log portion by a vacuum or suction system once free of the output log portion (optionally being a robotic vacuum or suction system), and wherein the output log portion is (optionally on command) axially rotated so as to present surfaces of the output log portion to said two or more rotary saw blades to facilitate each pass of said two or more rotary saws along a longitudinal length of the output log portion to yield one or a plurality of individual sticks, said sticks to be provided as a stream of sticks for subsequent processing.

There is also provided an apparatus for the division of an output log portion procured as a feed stream of log material for subsequent processing into a stream of a plurality of sticks, comprising:
  a pair of substantially opposing end mounts, each mount configured to be engageable with respective longitudinal ends of said output log portion,
  a drive configured to rotate said end mounts,
  a carriage with rotary saw blades to operate at 90 degrees with respect to each other thereby to make cuts to free a stick from a mounted output log portion in use in each carriage direction,
  a vacuum or suction system (optionally a robotic vacuum or suction system) to vacuum or suction remove each stick from the mounted output log portion as being and/or when cut free, and removal of each cut stick (optionally automatically or in an automated manner) from the mounted output log portion is by a vacuum or suction system once free of the output log portion (optionally being a robotic vacuum or suction system).

Optionally, one or more of said sticks of said stream of plurality of sticks may be accumulated, optionally being a temporary accumulation or temporary store, for provision to a subsequent processing step. Advantageously, said accumulation or store of said sticks being drawn upon or selected for a downstream subsequent processing step when there may be an interruption of an upstream processing step. Alternatively, said accumulation or store may be utilised to facilitate a continuing of an upstreaming processing step, when there may be an interruption of a downstream processing step.

The apparatus defined above may further comprise a logic program system to command at least the presentation of the mounted output log portion in use for each carriage pass thereby to optimise the yield of higher strength sticks in a range of strength sticks from each output log portion.

Preferentially the sticks are not removed from the log by the carriage. Instead, preferentially, but not exclusively limited to the following, the sticks are removed from the output log portion by collection from a vacuum or suction system once free of the output log portion, optionally being a robotic vacuum or suction system.

There is also provided a production line to manufacture a laminated wooden beam, the beam to be of profiled strength grade laminae, each cut to length from strength matched grade finger jointed shooks or sticks, the use of apparatus comprising:
  mounts to end mount and, on command, rotate a debarked log to provide the sticks,
  a carriage with rotary saw blades to operate at 90 degrees with respect to each other thereby to make cuts to free a stick from the mounted log in use in each carriage direction, the sticks not being dragged from the log by the carriage,
  a robotic system to suction remove each stick from the mounted log as being and/or when cut free, and
  a logic program system to command at least the presentation of the mounted log in use for each carriage pass thereby to optimise the yield of higher strength sticks in a range of strength sticks from each log.

Following on from the above, any remaining or remainder log lengths which are not of the predetermined length are to be discarded or are not utilised in subsequent processing step(s) of the process, or those log lengths remaining from the division which do not achieve the necessary predetermined longitudinal length are to be discarded from the process. Although such material may still have value and may be utilised in another process (e.g. may be on-sold for wood chip or fibre purposes).

Production of a stream of output log portions having a longitudinal length that is of substantially equal or substantially constant or consistent length to each of the other output log portions is preferential. In particular, each such output log portion which is to be utilised in subsequent processing in this process should advantageously be of a predetermined longitudinal length, which may be determined by the process or plant operator. Such length may be determined by factors such as the quality of log resource being received into the plant, or by other factors such as a determined effective length according to the either the resource being received into the plant or according to the intended final product to be made.

In one particular embodiment, the equal or substantially constant or consistent longitudinal length log portions are about 1 metre. That is, a predetermined longitudinal length may be set to about 1 metre. In alternative embodiments, the desired longitudinal length log portions may be less than about 10 metres, or less than about 6 metres, or less than about 5 metres, or less than about 4 metres, or less than about 3 metres, or less than about 2.4 metres, or less than about 2 metres, or less than about 1.5 metres, or less than about 0.5 metres.

Where output log portions are discarded from being provided as a feed for subsequent processing, such output log portions can be identified on basis of either:
  the output log portions are of a substantially different longitudinal length to the predetermined longitudinal length, or
  the output log portions are of a substantially unequal or substantially non-constant or inconsistent longitudinal length relative to the substantially equal or substantially constant or consistent longitudinal length output log portions.

Constancy and consistency of the longitudinal length (i.e. from end to end) of the output log portions feed into the production process facilitate the mechanization of production process and ability to increase production capabilities, together with the more automated control of process equipment based on constancy of infeed materials.

The output log portions should advantageously each have parallel ends (being a single log portion with a pair of opposing ends, said ends formed from said division operation of said input source log). In this manner, subsequent processing of the output log portion is also simplified so as to minimise downstream dimensionality cutting or refining.

A plurality of cutting heads (such as at least two, or at least three or more) or log cutters can be provided for acting or co-acting upon the input source log for dividing the input source log into the (optionally plurality of) output log portion(s). Any suitable log cutting device may be utilised, although it will be appreciated that the log cutter may typically be one of: a chain saw, a blade saw, a band saw. The input source log can be lifted onto a cutting deck, and suitably restrained from movement whilst a cutting or division operation is then carried out. Once the cutting or divisional operation has been conducted, the individual output log portions can then be conveyed downstream for subsequent further individual processing. Optionally, the restraints may carry on with said output log portions or the restraints may be moveable so as to release the output log portion so as to resume as suitable configuration for receipt of a further input source log.

Each of the individual output log portions procured as part of a feed stream of log material for subsequent processing are then individually subjected to a further division operation. This further divisional operation is carried out to generate a plurality of cut sticks (i.e. individual sticks) of a pre-determined dimension from said output log portion. The plurality of cut sticks are then provided as an output stream of sticks.

Stepping back, each individual output log portion procured as part of a feed stream of log material for subsequent processing is individually assessed to determine a further division operation to substantially maximise an available quantity of sticks of substantially equal or substantially constant or consistently dimension or cross-sectional profile as an output stream of sticks from said individual output log portion(s). That is, each output log portion is subjected to a cutting pattern along the longitudinal length so as generate a plurality of individually cut sticks from said output log portion. Each cut stick being of the longitudinal length of the output log portion.

This further division operation can be controlled (or varied or adjusted) so as to provide for the output stream of sticks sufficient for meeting or attempting to achieve one or more of:
- maximising the quantity of substantially equal or substantially constant or consistent dimension or cross-sectional profile sticks generated from an available volume of log material,
- minimising wastage or volume of log material unable to be used for generation of substantially equal or substantially constant or consistent dimension or cross-sectional profile sticks,
- maximising the quantity of substantially equal or substantially constant or consistent dimension or cross-sectional profile sticks from a particular portion of said log portion likely to be of a substantially similar performance or a characteristic requirement.

As noted, each individual output log portion is to be sequentially divided into a plurality of substantially similarly or the same dimensioned sticks, or a series of streams of sticks wherein each such stream is a stream of the same or substantially similarly dimensioned sticks.

As noted, each individual output log portion is to be sequentially divided into a plurality of substantially equal or substantially constant or consistent dimension or cross-sectional profile sticks, or a series of streams of sticks wherein each such stream is a stream of the same or substantially similarly dimensioned or cross-sectional profile sticks.

As noted, each individual output log portion is to be subjected to a sequential division operation to provide for a resultant output stream of sticks being of a substantially equal or substantially constant or consistent longitudinal length as the individual log portion procured as part of said feed stream of log material for subsequent processing. At least a portion of said output stream of sticks resultant from said sequential divisional operation being of substantially equal or substantially constant or consistent longitudinal length are of a substantially consistent dimensionality with respect to cross-sectional profile (such as a width and a thickness) of each said resultant output stick as a stream of sticks.

Each of these sticks matching as to the longitudinal length of the output log portion from whence they were derived.

Consequently, the output stream of sticks generated from the sequential division of the output log portion operation undergo an assessment or profiling as to one or more performance or characteristic requirements, to provide for a relative grading of each generated stick.

Accordingly, an output stream of sticks derived from a log source (such as the output log portion), where the sticks are of a substantially equal or substantially constant or consistent longitudinal length and of a substantially consistent dimensionality with respect to cross-sectional profile (such as a width and a thickness), can then be subjected to a drying or a moisture removal step to substantially reduce a moisture content of each stick of said stream of sticks.

The output stream of sticks are directed (e.g. by conveyance) to be subjected to a dryer or a drying operation or a moisture conditioning routine of said output stream of sticks.

The moisture removal step comprises diverting or directing or conveying the stream of sticks as an input stream of sticks to a dryer and retaining the sticks within said dryer for a pre-determined period of time sufficient to remove or reduce the moisture content of said sticks to a notional moisture content value. The sticks within the dryer are exposed to conditions sufficient to remove moisture from the sticks.

There are a number of lumber drying devices and processes which would be suitable for this process, at least one of which should preferably operate in conjunction with the process and device as set forth in PCT/NZ2010/000228, the contents of which are hereby incorporated by reference.

Advantageously, derived is an output stream of sticks of reduced moisture content relative to an input stream of sticks is received or delivered from said dryer.

The output stream of sticks may be at least partially conditioned or re-conditioned from a minimum moisture content level achieved within said dryer by a partial uptake of moisture yielded from an input or incoming stream of sticks or by another source of reconditioning moisture.

In some configurations, the output stream of sticks may have their moisture content removed or reduced to a level of 12% on a weight basis of a dried or moisture conditioned stick.

The dryer may operate on a counter-flow basis with respect to incoming and outgoing streams of sticks to be dried.

The output stream of sticks can be aggregated and laid up into an arrangement on racks, such as a stacked assembly of multiple rack layers as a pallet to hold or retain the sticks therein during the drying stage. Such a pallet or arrangement can be advanced into a drying operation, and a drying airflow or gas flow stream is directed as a flow path to pass from said pallet advancing into a dryer toward a pallet exiting from said dryer.

Where a reconditioning stage is carried out within the dryer, in one mode, moisture removed from an incoming set of sticks may be directed to an outgoing set of sticks. In such a mode, an airflow or gas flow can direct moisture removed from the sticks of the advancing (incoming) pallet and directs at least some of the moisture toward sticks of the exiting (outgoing) pallet which is to be removed from the dryer. In this manner, moisture from sticks being advanced into a dryer are directed to sticks being exited from said dryer as a conditioning or re-conditioning step of those sticks being exited.

The stream of sticks procured from the output log portion (and optionally subjected to the drying stage) are also subjected to a structural testing or structural vetting routine.

For example, a process for the structural testing or vetting routine of a stream of sticks can comprise one or more of:
- a removal of sticks from said stream of sticks when defective as to a measured or determined or observed predetermined structural performance or characteristic,
- a deflection testing of each (optionally dried) stick of said stream of sticks for match of a grading of said sticks as to shook stock,
- a bending test of each (optionally dried) stick of said stream of sticks (i.e. a longitudinal deflection) as to a minimum bending capability or characteristic,
- an end loading test (i.e. a longitudinal compression) as to a minimum end load capability or a load characteristic,
- a stick strength test as to a minimum strength capability or characteristic.

As such, each stick which passes the structural testing or structural vetting routine is directed (e.g. by conveyance) for a subsequent processing step.

Further, each stick which passes said structural testing or structural vetting routine is graded or characterised as to a structural testing or structural vetting routine test or measured result, and are directed (e.g. by conveyance) for the subsequent processing.

Those stick which do not pass the structural testing or structural vetting routine is/are discarded or rejected from further use within the process.

The out stream of sticks which have passed the structural testing or structural vetting routine are subsequently accumulated and grouped with like sticks of the same or similar or within a range of the grading or characterisation of each stick. That is, an attribute or value is provided to each stick representative of each stick test result from the testing or vetting routine, and then sticks of like or same or similar or within a range of a defined attribute or value are accumulate together for subsequent processing.

Accordingly, there is a process for the accumulation of sticks wherein there is provided a received stream of uniquely pre-graded or pre-profiled or pre-characterised sticks. In that process, individual sticks of the stream of sticks are diverted to a store (storage or holding bay or other facility) for collecting or aggregating a plurality of sticks of a substantially similar profile or grade or of sticks of a profile or grade falling within a particular pre-determined range of performance or characteristic requirements. This facilitates an accumulation of such sticks for subsequent delivery to the process or for procurement from the storage or holding bay of one or a plurality of sticks from one or more of said storage or holding bays of the same or different profile or grading for use in subsequent processing.

A predetermined selection of a plurality of same or differently as-graded or pre-graded or pre-profiled or pre-characterised sticks is made of a store or accumulation of sticks is made, and that selection of sticks is then directed to (e.g. by conveyance) for a subsequent processing step.

The as-graded or characterised sticks are uniquely separated and uniquely accumulated or stored with substantially similarly graded or characterised sticks for a subsequent processing step.

The accumulator is receivable of a stream of uniquely pre-graded or pre-profiled sticks, with individual sticks of the stream of sticks being diverted to a store (storage or holding bay) or other facility for collecting a plurality of sticks of a substantially similar profile or grade or of sticks of a profile or grade falling within a particular pre-determined range of performance or characteristic requirements. This facilitates an accumulation of such sticks for subsequent delivery to the process or for procurement from the store (storage or holding bay) of one or a plurality of sticks from one or more of said storage or holding bays of the same or different profile or grading for use in subsequent processing.

A predetermined selection of a plurality of same or differently as-graded or pre-graded or pre-profiled or pre-characterised sticks is then made of a store or accumulation of sticks is made, and the selection of sticks is directed to (e.g. by conveyance) for a subsequent processing step.

The predetermined selection is of pre-defined quantity of sticks (i.e. being of sufficient quantity or number so as to form, once joined, a longitudinal length composite stick of a length required for subsequent processing, perhaps similar to a final laminate product to be made) from the same as-graded or pre-graded or pre-profiled or pre-characterised store or accumulation, and provided as a group of sticks for a subsequent processing step.

The subsequent processing step is applied to the sticks of the group, the sticks of that particular or unique group being conveyed sequentially (e.g. are conveyed and processed in a linear manner).

In a further embodiment, there is provided a method of accumulating individual sticks procured from a source of wood or log material and aggregating a plurality of those individual sticks into different groups. The method comprises determining (e.g. by measurement) one or more physical parameter(s) or qualities of an individual stick. For example, these can be parameters or qualities relating to strength, or stiffness or appearance or other observable defects or other observable appearance traits, or may be quantifiably determined physical parameters relating to structural characteristics of the stick itself. Once the determination or measurement has been carried out, then there can be an attributing of a prescribed value (or other quantifier) to each individual stick based on that earlier determination (e.g. by measurement) which fall within a predetermined range.

Based on the determination and the attribution of a prescribed value, sticks of the same prescribed value can be accumulated into their separate groups, such that sticks of the same prescribed value are accumulated together.

Further, an adjustment or an adjusting of the predetermined range can be carried out to vary the prescribed value which is to be attributed to a subsequently determined individual stick or sticks by adjusting one or more of:
said range,
a lower limit of said range,
an upper limit of said range.

Each group of accumulation of sticks, is to be of sticks of the same prescribed value or within a range of the prescribed value.

There may be more than three groups, or more than five groups, or more than ten groups. Alternatively, there may be nine groups, or there may be five groups, or 0 there may be three groups. Any number of groups may be provided, so long as the sticks of the same prescribed value are accumulated into the same group.

One or more of the range or the lower limit of the range or the upper limit of the range, for each of the groups, can be adjusted based on adjusting an upper bound and a lower bound of the prescribed value (or quantifier) of a predetermined number of sticks received for a subsequent processing.

Alternatively, the range, for each group, can be adjusted by adjusting an upper bound and a lower bound of the prescribed value (or quantifier) of a predetermined number of sticks received for a subsequent processing. Still further, alternatively, the range, for each group, can be adjusted by adjusting an upper bound and a lower bound of the prescribed value (or quantifier) of the sticks of each group, where the upper and lower bounds are based on a predetermined number of sticks received for a subsequent processing.

The adjustment can be made either on a stick-by-stick basis to account for a variation in the number of sticks being directed to each group, or based on a collection of sticks or a time period of counting of sticks or a time period of operating the production process (there thereby may be based on a linear speed of the manufacturing plant and an approximation of the number of sticks which are otherwise received as a stream of sticks to be processed).

The predetermined number of sticks is a stick count of more than about 10 sticks, or more than about 100 sticks, or more than about 250 sticks, or more than about 500 sticks, or more than about 1,000 sticks, or more than about 2,000 sticks, or more than about 5,000 sticks, or more than about 10,000 sticks. In other words, the adjusting or adjustment can be based on a stick count of a stream of sticks or the last 10 sticks counted, or more than about the last 100 sticks counted, or more than about 250 sticks, or more than about 500 sticks, or more than about 1,000 sticks, or more than about 2,000 sticks, or more than about 5,000 sticks, or more than about the last 10,000 sticks counted.

Alternatively, in a time-based methodology, the adjusting or adjustment is based on a predetermined period of production or processing, such as for example the last 10 minutes or the last 20 minutes, or the last 30 minutes, or the last 40 minutes, or the last 50 minutes, or the last 60 minutes of production or processing or of sticks.

A predetermined number of sticks may be a stick count of about 10 sticks, or about 100 sticks, or about 250 sticks, or about 500 sticks, or about 1,000 sticks, or about 2,000 sticks, or about 5,000 sticks, or about 10,000 sticks.

The adjusting or adjustment is advantageously made so that each group of the separate groups receives, or is to receive, a predetermined proportion of the plurality of sticks or the sticks of the stream of sticks, procured from said source of wood or log material.

There can be a count or an assessment of the number or quantity of sticks in each grade, and the adjusting or adjustment can be carried out dynamically so as to provide for a balance or balanced proportion or a pre-determined proportion of sticks to be accumulated or attributed values provided to each sticks so as to ensure for a balance or a balanced proportion of the sticks being delivered or received into each grade as a result of the prescribed value attributed to each stick.

Each group may receive the same or a similar proportion. Alternatively, one or more of the groups may receive a different or dissimilar proportion. Still further, one or more of the groups may receive the same or a similar proportion as the other groups.

The balancing may be configured so that at least one (or one) of the group(s) is to receive a different or dissimilar proportion of the plurality of sticks, and the remaining groups then receive the same or a similar proportion as each of those other remaining groups.

Each group is representative of a range of sticks, i.e. having the same prescribed value (or other quantifier) or being within a predetermined range of a prescribed value (or other quantifier).

The adjusting or adjustment can be performed dynamically based on a stick count or based on the predetermined number of sticks.

The relative proportions of the quantity of sticks accumulated into each group may be sufficient so as to provide for a collation of sticks, each stick being of a prescribed value (or other quantifier), for the subsequent selective combination of sticks from each individual group for re-assembly into a composite stick.

The composite stick can be assembled from individual sticks from the same group. A plurality of composite sticks are to be assembled for subsequent use, with each assembled composite stick being derived of individual sticks from an individual group.

The plurality of separate composite sticks are to be provided from different or separate groups. More specifically, a first composite stick is to be provided from assembly of sticks from a first group, while a second composite stick is to be provided from assembly of sticks from a second group, and so on. Each composite stick so formed is to be provided as an individual laminae of a laminate product which is to be ultimately produced.

The subsequent processing step comprises an end-wise stick jointing operation.

The end-wise stick jointing operation can a finger jointing stage for finger jointing a tail of a leading stick with a head of a trailing stick.

Of the group of sticks selected, a first leading stick has only a tail finger jointed with a following stick, and a final trailing stick has only a head finger jointed with an immediately leading stick, with each of the sticks intermediate thereof being finger jointed with each of an immediately leading stick and an immediately trailing stick thereof.

The said finger joint may comprise an adhesive applied thereto. For example, an adhesive may be applied previously to finger joint cut of respective ends of each stick of the group. Adhesive examples include pressure sensitive adhesives. Once end-wise joined together the group of sticks is thus formed into a composite stick.

The finger jointing can operate on a continuous basis to produce a continuous length of finger jointed assembled stick. In this manner, the continuous lengths can then be cut to a length which is of a pre-determined or a pre-defined length.

Various finger jointing operations may be utilised. However, in one embodiment, and commensurate with intended advantages of this invention for the mechanization and improved manufacturing efficiency or speed of production, there can be provided a process for the end-wise finger jointing of a plurality of sticks to each other, wherein a selection of sticks are directed to have fingers made at an end (i.e. both ends) of each stick, or each end of each said stick.

At least some of the sticks can be subjected to a finger joint making device so as to be provided with fingers made at each end (i.e. both ends). In this manner, at least some sticks of the group (or more specifically, the total number of sticks in the group minus two), can be provided with finger joints at each end, and those finger joints at each end may be made simultaneously by a dual cutting head finger joint making device. For example, a finger jointer can be provided with a pair of cutting heads configured to cut fingers at each end of the same stick in a single pass.

Of the sticks to be finger jointed, in one embodiment all of the sticks are provided as a single packet and are then shaped or provided with fingers made at each end (i.e. both ends) in a simultaneous operation.

The grouped selection of sticks to be end-wise assembled together are done so via end-wise joining to provide for an assembled composite of a series of sticks (i.e. those sticks of the group) being of greater longitudinal length than each of said individual sticks.

The finger jointing operation operates on a continuous basis to produce a continuous length of finger jointed assembled stick. The continuous length of finger jointed assembled sticks are cut to a length which is pre-determined or a pre-defined length according to the downstream requirements of the length of the ultimate product to be made.

It will be appreciated that there may be multiple finger shaping devices, and multiple finger jointing assembly operations, such that each finger jointing assembly is finger jointing together a continuous stream of sticks of the same attributed or prescribed value. In this manner, a series of finger jointer assembly operations can be operated simultaneously to provide for an outputted length of assembled composite sticks, where the selection of individual sticks making up each composite stick are each of the same attributed or prescribed value.

A series of different composite sticks can be produced, each being formed of their own separate selection of individual sticks which are of the same prescribed or attributed value.

In this way, a plurality of composite sticks can be produced and provided for subsequent lamination together in a press according to a pre-determined recipe of which composite sticks are to be assembled together in a predetermined order (i.e. according to an arrangement of which composite sticks of which prescribed value individual sticks are to be provided more to the outer layer or laminae or surface of the product to be formed, and which are to be provided more toward the core or away from the outer laminae or outer surface).

A first selective combination of as-graded or pre-graded or pre-profiled or pre-characterised sticks are assembled into a first composite or an assembled composite stick of a predetermined length, for provision in a subsequent processing step.

A second or subsequent selective combinations of as-graded or pre-graded or pre-profiled sticks are assembled into a second composite or a subsequent composite or second or subsequent assembled composite stick of a predetermined length, for provision in a subsequent processing step.

A combination of sticks is/are assembled by joining two or more as-graded sticks together, the joining preferentially being a finger-jointing operation of longitudinal ends of the as-graded sticks to procure an assembled composite stick.

The aforementioned composite stick is to be formed of a group of sticks being of a known collection of sticks of previously pre-determined grade or profile or characterisation.

Accordingly, a serially produced lamina into a laminate, comprises selectively combining of two or more of the assembled composite sticks along a longitudinal side surface or face of each said composite stick, into a multi-layer composite arrangement.

More specifically, an assembled composite stick is serially advanced in a longitudinal manner to a feed end of a press.

An adhesive is applied to at least one longitudinal side surface or face, the longitudinal side surface or face comprising of the adhesive to be brought into facing contact with a more advanced assembled composite stick of an opposing longitudinal side surface or face of the more advanced assembled composite stick.

A sequential layup of assembled composite sticks combines to form a multi-layer composite arrangement or construct by adherence of adjacent longitudinally facing side surfaces or faces of each composite stick which are brought together.

The selective combination of two or more of the assembled composite sticks are then pressed together along a longitudinal facing side surfaces or faces of said selective combination, being pressed at a predetermined pressure or pressurising force.

The selective combination of two or more of the assembled composite sticks are pressed together for a predetermined period of time.

The predetermined period of time is sufficient for the adhesive to cure or set.

The selective combination of two or more of the assembled composite sticks are pressed together and exposed to a predetermined temperature.

The predetermined temperature is an elevated temperate sufficient to enable a curing of adhesive previously applied.

The selective combination of two or more of the assembled composite sticks are pressed together and exposed to an energy source capable of initiating or facilitating a curing of adhesive previously applied.

The energy source is one or more of: infra-red, microwave, radiofrequency, heated platens (such as heated by electrical heaters, hot oil, hot water or other working fluids), elevated temperatures, other energy sources for curing an adhesive.

The selective combination of assembled composite sticks are face joined to each other to form a laminate product.

According to the method in which the product is to be formed, a plurality of individual laminate products may reside simultaneously within the press. That is, each individual laminate product is to be advanced incrementally through the press by a dimension (such as a thickness) or by an amount equivalent to each separate composite stick being advanced into the feed end of the press.

In other words, each individual laminate product is incrementally advanced through into and the press by a dimension matching the dimension of a sequentially fed composite stick being fed into or imputed into the feed end of the press. That is, each individual laminate product is also to be incrementally advanced out of the outlet of the press matching the dimension of a sequentially fed composite stick being fed into the feed end or inlet of the press.

The laminate product is finished as to final appearance and/or dimension (such as such as by subjecting said product to one or more of: a thicknesser, a gauger, a cutter; for adjusting one or more of: length, width, thickness; of said product).

The product is subject to a determination of product quality parameter (such as to a minimum strength requirement, a minimum bending requirement, or another a predetermined physical characteristic of each product so formed). The determination of said product quality provides a measured assessment as to meeting minimum product quality parameters.

In the treatment of the product, the laminate wood product produced from a serially arranged layout of lamina may further be subject to a wood treatment or wood preservation composition. The treatment step comprising the steps of:
  in a first step, subjecting the entirety of the laminate wood product to a wood treatment or preservative composition within a spray booth, and then
  in a second step, subjecting the entirety of the laminate wood product received from the first step by submerging the laminate wood product in a bath of a wood treatment composition.

The second step can be utilised as a conditioning or re-conditioning step for increasing a relative moisture content of the laminate wood product. The moisture content of the reconditioned product may be about 7% to about 9% water by weight of the product.

Where, in the foregoing description reference has been made to integers or components having known equivalents thereof, those integers are herein incorporated as if individually set forth.

Although the present disclosure has been described in terms of certain embodiments, other embodiments apparent to those of ordinary skill in the art also are within the scope of this disclosure. Thus, various changes and modifications may be made without departing from the spirit and scope of the disclosure. For instance, various components may be repositioned as desired. Moreover, not all of the features, aspects and advantages are necessarily required to practice the present disclosure. Accordingly, the scope of the present disclosure is intended to be defined only by the claims that follow.

The invention claimed is:

1. An automated method of accumulating individual sticks procured from a source of wood or log material into separate groups, the method comprising:
   determining one or more physical parameters or qualities of each of the individual sticks, by subjecting each of the individual sticks to a structural test or a structural vetting routine;
   attributing a prescribed value or other quantifier to each of the individual sticks of which the determined one or more physical parameters or qualities fall within a predetermined range;
   accumulating together the individual sticks of the same prescribed value or other quantifier into one of the separate groups;
   assembling, into an end-wise jointed composite stick, the individual sticks from each of the separate groups;
   adjusting the predetermined range to vary the prescribed value or other quantifier to be attributed to one or more subsequently determined individual sticks by adjusting one or more of the predetermined range, a lower limit of the predetermined range, and an upper limit of the predetermined range, such that a relative proportion of a quantity of the one or more subsequently determined individual sticks that are accumulated into each of subsequent groups is sufficient for a subsequent assembly of the one or more subsequently determined individual sticks from each of the subsequent groups into an end-wise jointed composite stick;
   accumulating together the one or more subsequently determined individual sticks of the same varied prescribed value or other quantifier into one of the subsequent groups; and
   assembling, into an end-wise jointed composite stick, the one or more subsequently determined individual sticks from each of the subsequent groups.

2. The method of claim 1, wherein a number of the separate groups is three, five, nine, or ten.

3. The method of claim 1, wherein the adjusting is performed on one or more of:
   a stick-by-stick basis; and
   a stick count of a stream of sticks of one among the last 10 sticks counted, more than the last 100 sticks counted, more than the last 250 sticks counted, more than the last 500 sticks counted, more than the last 1,000 sticks counted, more than the last 2,000 sticks counted, more than the last 5,000 sticks counted, and more than the last 10,000 sticks counted.

4. The method of claim 1, wherein the adjusting is based on a predetermined period of production or processing.

5. The method of claim 4, wherein the predetermined period of production or processing is one among the last 10 minutes, the last 20 minutes, the last 30 minutes, the last 40 minutes, er the last 50 minutes, and the last 60 minutes.

6. The method of claim 1, wherein the adjusting is made such that each of the subsequent groups receives a predetermined proportion of the quantity of the one or more subsequently determined individual sticks procured from the source of wood or log material.

7. The method of claim 1, wherein there is a count of a number of the individual sticks in each of the separate groups, and
   the adjusting is carried out dynamically to provide a balanced proportion or a predetermined proportion of the quantity of the one or more subsequently determined individual sticks to be accumulated into each of the subsequent groups.

8. The method of claim 1, wherein one or more of the separate groups and the subsequent groups receives one among:
   a different proportion to other groups among the separate groups and the subsequent groups;
   the same proportion as the other groups; and
   a different proportion to the other groups, while each of the other groups receives the same proportion.

9. The method of claim 1, wherein each of the separate groups is representative of a range of the individual sticks having the same prescribed value or other quantifier or being within a predetermined range of the prescribed value or other quantifier.

10. The method of claim 1, the adjusting is performed dynamically based on a stick count or based on a predetermined number of sticks.

11. The method of claim 1, wherein a plurality of composite sticks are assembled, each of which is derived of the individual sticks from an individual group among the separate groups.

12. The method of claim 1, wherein a plurality of separate composite sticks are assembled from different ones among the separate groups.

13. The method of claim 1, wherein a first composite stick is assembled from the individual sticks from a first group among the separate groups, a second composite stick is assembled from the individual sticks from a second group among the separate groups, and a subsequent composite stick is assembled from the individual sticks from a unique or individual further group among the separate groups.

14. The method of claim 1, wherein the end-wise jointed composite stick is to be provided as an individual laminae of a laminate product.

* * * * *